May 17, 1960  W. H. BOGGS  2,937,058
BEARING MOUNT

Filed Oct. 27, 1958 2 Sheets-Sheet 1

INVENTOR.
WILLIAM H. BOGGS
BY D. Emmett Thompson
Attorney

United States Patent Office 2,937,058
Patented May 17, 1960

2,937,058

BEARING MOUNT

William H. Boggs, Syracuse, N.Y., assignor to The Porter-Cable Machine Company, Syracuse, N.Y., a corporation of New York Application October 27, 1958, Serial No. 769,658

3 Claims. (Cl. 308—132)

This invention relates to a mounting arrangement for bearings having an outer spherical surface which permits movement of the bearing relative to its supporting member whereby the bearing is of the self-aligning type.

Such bearings are used extensively in structures such as electrical motors and in which the components making up the motor housing are not machined or formed accurately. For example such components are often formed by being stamped from sheet metal or consist of die castings which are not machined before assembly. Due to the spherical form of the bearing, it is permitted to move in its support so that the bore of the bearing assumes a position parallel with the axis of the shaft without putting undue stress or strain on the shaft.

Because these spherical self-aligning bearings are used principally to effect a reduction in the cost of the machine structure they are usually of the sleeve type as distinguished from the anti-friction or ball bearing type. When these bearings are used for mounting a shaft rotated at high speeds, such as the armature shaft of a universal type motor, there exists the problem of providing adequate lubrication of the bearing.

This invention has as an object a bearing assembly embodying a structural arrangement whereby the bearing is adequately supported and effective lubrication is provided whereby the bearing is substantially free from maintenance over long periods of use.

The invention consists in the novel features and in the combinations and constructions hereinafter set forth and claimed.

In describing this invention, reference is had to the accompanying drawings in which like characters designate corresponding parts in all the views.

In the drawings—

Figure 1:
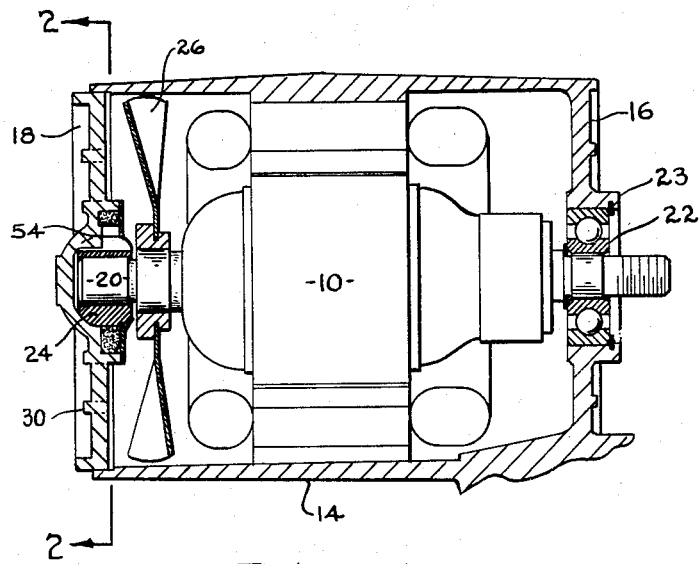
Figure 1 is a cross-sectional elevational view.

In the embodiment illustrated in the drawings the invention has been shown in connection with a motor housing used to enclose and support an electric motor for use in connection with portable tools. It is understood, however, that the invention may be used in connection with any shaft mounting.

In Figure 1 an electric motor, generally indicated at 10, has been shown as mounted in a cylindrical housing 14, having a front end 16. The rear open end of the motor housing is shown as being closed by an end-plate or cap 18.

The motor 10 includes an armature 20 having its forward end supported in a ball bearing assembly 22 mounted in a hub 23 formed in the forward wall 16 of the motor housing. The rearward end of the shaft 20 is supported in a self-aligning spherical bearing 24 mounted in the end-plate 18 in a manner to be hereinafter described. A cooling fan 26 has been shown as being mounted on the shaft 20 intermediate the end-plate 18 and the motor 10.

Figure 2:
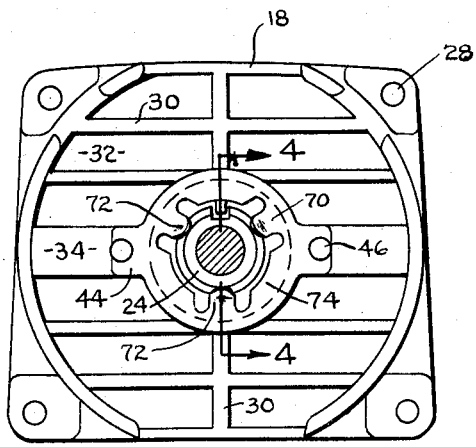
Figure 2 is a view taken on line 2—2 of Figure 1.

Referring to Figure 2, it will be seen that the end-plate 18 is generally rectangular in form, and is provided with four (4) apertures 28 at its corners to receive screws (not shown) to affix the end-plate 18 to the motor housing. The end-plate 18 is formed with a plurality of transversely intersecting ribs 30 which form apertures 32 to permit air to be drawn through the motor housing by the fan 26.

The end-plate 18 is provided with a thickened transversely extending central rib 34 which is enlarged at its center to provide a hub formed on its inner surface with a concavity having a bottom wall 36 emerging with an upstanding circular concave side wall 38 which terminates at its upper end in a radially outwardly extending annular shoulder or seat 40. A cylindrical flange 42 surrounds the seat 40 in radially spaced relation to the concave wall 38 for a purpose to be hereinafter described (see Figure 3).

Figure 3:
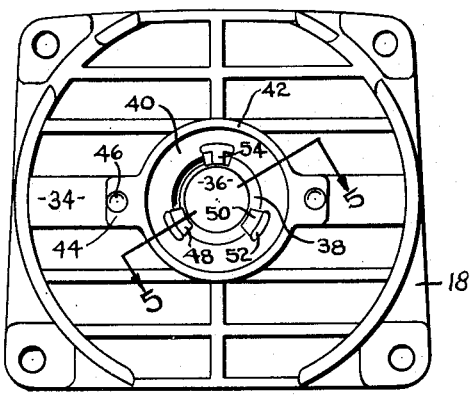
Figure 3 is a view similar to Figure 2 with parts omitted.

The rib 34 is formed adjacent the flange 42 with a pair of lugs 44 which extend radially outwardly from the flange 42 in coplanar relation therewith and a pair of protuberances 46 are formed on the lugs 44 for a purpose to be hereinafter described. As best seen in Figure 3, three (3) lugs or ribs 48 are formed on the inner surface of the wall 38 and have a portion 50 extending radially inwardly therefrom to provide a three-point support for the spherical bearing 24. The ribs 48 also have portions 52, which extend axially upwardly from the surface of the seat 40 in radially inwardly spaced relation from the flange 42 and in concentricity therewith.

Figures 4, 5:
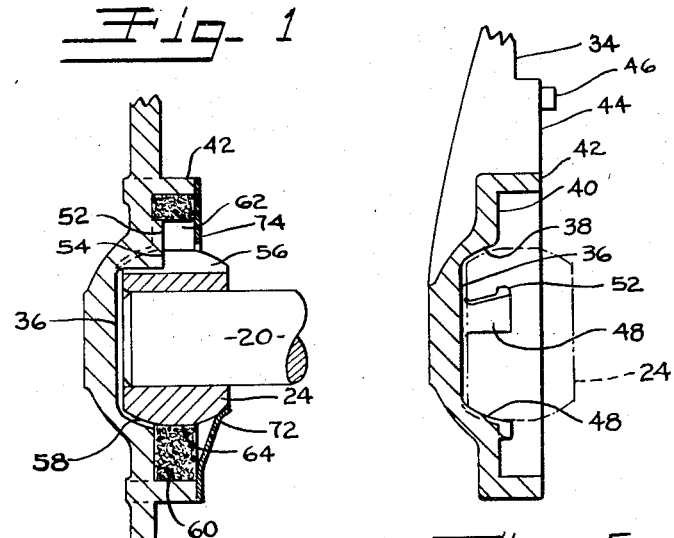
Figure 4 is an enlarged cross-sectional view taken on line 4—4 of Figure 2.
Figure 5 is an enlarged cross-sectional view taken on line 5—5 of Figure 3.

As best seen in Figures 3 and 4, one of the ribs 48 is formed with a radially inwardly extending tang or key 54 which cooperates with an oversize axially extending slot 56 formed in the outer surface of the bearing 24 to prevent rotational displacement of the bearing 24 in the concavity. The oversize slot 56, however, permits relative movement between the bearing 24 and the tang 54 whereby to facilitate the self-centering of the bearing in the concavity. As best seen in Figures 4 and 5, the ribs 48 support the bearing 24 in spaced relation from the bottom wall 36 of the concavity and side wall 38 thereof, providing a passage 58 to permit lubricant to flow through the space formed thereby to enter the bearing 24 to reduce friction between the bearing 24 and the shaft 20.

An oil impregnated washer, or wick 60, formed with three (3) notches 62, positioned complementally to the ribs 48, is received on the seat 40 with the ribs 48 received in the notches 62 to provide the lubricant for the bearing 24. As will be obvious, the portions of the center bore 64 formed in the washer 60 intermediate the three (3) notches 62, will engage the periphery of the bearing 24 whereby to permit the oil carried by the washer 60 to lubricate the inner end of the bearing.

Referring now to Figure 2, a spring retainer 70 is received on the surface of the lugs 44 and is affixed to the lugs 44 by swedging over the protuberances 46. The retainer is formed with three (3) radially inwardly extending fingers 72 which engage the inner edge of the bearing 24 as seen in Figure 4 to retain the bearing in the concavity. Intermediate the fingers 72, the retainer is formed with radially inwardly extending portions 74 which serve to retain the washer 60 on the seat 40.

As will be obvious the three-point mounting of the bearing 24 on the surfaces 50 of the ribs 48 permits the bearing 24 to center in the concavity when the shaft 20 is received in the bearing 24, whereby to compensate for any misalignment between the concavity formed in the end plate 18 and the shaft 20 due to warpage, or the like. At the same time, however, the bearing 24 is retained in the concavity in spaced relation to the side wall 38 and bottom wall 36 of the concavity whereby to permit and facilitate lubrication of the bearing. It will, therefore, be seen that by my construction I have provided a new and improved bearing mount for self-alignment bearings which is economical to construct and which provides adequate lubrication for the bearing.

What I claim is:

1. In a bearing assembly, a plate formed with a spherical concavity, a plurality of ribs of spherical formation formed on the surface of said concavity, a cylindrical flange surrounding said concavity and being spaced radially therefrom to form a washer seat, said ribs extending radially inwardly from said seat, a spherical bearing positioned on said ribs in said concavity and having a portion extending axially outwardly from the concavity, inter-fitting means between one of said ribs and said bearing to restrain said bearing against rotation in said concavity, a lubricating washer positioned on said seat and surrounding said bearing, said washer being formed with a plurality of notches for the reception of said ribs whereby said washer is restrained against rotational movement on said seat, and means for retaining said bearing in said concavity and said washer on said seat.

2. In a bearing assembly, a supporting plate formed with a circular depression, an upstanding flange surrounding said depression, said flange being radially offset from said depression to form a marginal shoulder, a plurality of circumferentially spaced apart lugs formed in said depression, and extending radially inwardly therefrom, one of said lugs being formed with a radially inwardly extending tang, a spherical bearing mounted in said depression on said lugs and being formed in its periphery with an axially extending slot to receive said tang, a portion of said bearing extending axially outwardly beyond said shoulder, an annular oil wick positioned on said shoulder and engaging the outwardly extending portion of said bearing, a bearing retainer fixedly secured to said plate and having portions extending into engagement with said wick and said bearing.

3. A bearing assembly, a supporting plate formed with a concavity in one side, a plurality of ribs on the inner surface of said concavity, said ribs being of spherical formation, a cylindrical flange encircling said concavity and being radially offset therefrom to form a marginal shoulder about said concavity, a spherical bearing having a portion extending into said concavity and engaging said ribs, said ribs extending axially outwardly from said shoulder and one of said ribs being formed with a tang extending radially inwardly for engagement with an axially extending slot formed in the periphery of said bearing to restrain the same against rotation in said concavity, an annular oil wick positioned on said shoulder and being formed in its bore with notches to receive the outwardly extending portions of said ribs, a retaining member fixedly secured to said plate and having portions yieldingly engaging said bearing and having other portions engaging said wick to maintain the same on said shoulder.

References Cited in the file of this patent

UNITED STATES PATENTS

| | | |
|---|---|---|
| 2,124,479 | Whitaker | July 19, 1938 |
| 2,308,610 | Koch | Jan. 19, 1943 |